US008079457B2

(12) United States Patent
Heinz

(10) Patent No.: US 8,079,457 B2
(45) Date of Patent: Dec. 20, 2011

(54) DEVICE FOR FEEDING BOARDS TO CROSSCUT SAWS

(75) Inventor: Alois Heinz, Unterroth (DE)

(73) Assignee: GreCon Dimter Holzoptimierung Süd GmbH & Co. KG, Illertissen (DE)

( * ) Notice: Subject to any disclaimer, the term of this patent is extended or adjusted under 35 U.S.C. 154(b) by 168 days.

(21) Appl. No.: 12/111,226

(22) Filed: Apr. 29, 2008

(65) Prior Publication Data

US 2008/0276778 A1 Nov. 13, 2008

(30) Foreign Application Priority Data

May 11, 2007 (DE) ......................... 10 2007 024 219

(51) Int. Cl.
*B65G 47/68* (2006.01)

(52) U.S. Cl. .................. 198/435; 198/369.1; 198/369.2

(58) Field of Classification Search .................. 198/348, 198/351, 368, 369.1, 369.2, 369.3, 434, 435, 198/465.1, 469.1, 589, 592, 604, 620, 698, 198/699.1, 817, 861.5, 459.1, 459.6, 459.7, 198/419.1, 419.2
See application file for complete search history.

(56) References Cited

U.S. PATENT DOCUMENTS 1,753,036 A * 4/1930 Williamson et al. ....... 198/369.2
1,860,679 A * 5/1932 Lockhart et al. ........... 198/861.5
1,913,533 A * 6/1933 Brunner ......................... 198/431
1,929,204 A * 10/1933 Jeffrey et al. ................. 198/435
2,724,486 A * 11/1955 Hatch et al. ................ 198/369.2
3,587,876 A * 6/1971 Dahlem ..................... 414/789.1
3,890,509 A * 6/1975 Maxey ..................... 250/559.25
4,650,061 A * 3/1987 Hasenwinkle et al. .... 198/462.3
4,838,408 A * 6/1989 Brawn .......................... 198/434

FOREIGN PATENT DOCUMENTS

DE 3707194 A1 9/1988
DE 10340752 A1 3/2005

* cited by examiner

*Primary Examiner* — Gene Crawford
*Assistant Examiner* — William R Harp
(74) *Attorney, Agent, or Firm* — Gudrun E. Huckett

(57) ABSTRACT

A device for supplying boards to crosscut saws has a feeding device and a transverse transport unit arranged downstream of the feeding device. Several loading planes are arranged downstream of the transverse transport unit and positioned at different levels. The boards are supplied on the loading planes to a crosscut saw, respectively. The transverse transport unit is adjustable relative to the loading planes about an axis that is transverse to a transport direction of the boards on the transverse transport unit. A stop is adjustably arranged in the transport path of the boards on the transverse transport unit, wherein the stop, without sensing the boards, is adjustable exclusively by a control unit of the device. When the transverse transport unit is being adjusted into a new position relative to the loading planes, the stop prevents further transport of the boards to the loading planes, respectively.

9 Claims, 4 Drawing Sheets

DEVICE FOR FEEDING BOARDS TO CROSSCUT SAWS

BACKGROUND OF THE INVENTION

The invention relates to a device for feeding boards to crosscut saws comprising at least one feeding device and at least one transverse transport unit arranged downstream which transverse transport unit has arranged downstream thereof at least two loading planes, positioned at different levels on which the boards are supplied to at least one crosscut saw, respectively, and which transverse transport unit is adjustable about an axis transverse to the feeding direction of the boards relative to the respective loading plane.

In wood processing it is known to first scan boards or pieces of wood to be sawed by means of a stationary scanning unit in a continuous process to detect in this way e.g. flaws in the boards that must be removed during further processing. The board data acquired by the scanning unit are optimized by software and a cutting list is computed for each board. Based on the cutting list, the scanned board is then processed by the crosscut saws. After the scanning process, the boards are received by a mechanizing device wherein at the transfer station the proper cutting list is assigned to the respective board. The boards with assigned cutting list are supplied to one or several cross-cut saws. After the scanning process, the boards, aligned with one end face, are transferred from a feeding device in the form of a wide roller table with cam chains or a wide transport belt with transport compartments on top to a downstream transverse transport unit. At this location, the boards are individually received by the transverse transport unit and individually held in place by means of so-called floating pawls. Floating pawls are pneumatically controlled stop element rows that are actuated by signals of the device control. This signal is generated by one or several photo cells when the board is in the correct position. After receiving a certain number of boards, preferably between five and ten boards, the transverse transport unit is pivoted such that the boards are transferred to the downstream loading plane on which they are transported to the crosscut saw.

Often two loading planes arranged above one another are provided and they each have a crosscut saw correlated therewith. It is also possible to provide downstream a second transverse transport unit which is pivotable and by means of which further loading planes that have correlated therewith further crosscut saws, are accessed. The control in regard to the position of the boards on the transverse transport unit and the distribution of the boards onto the respective loading planes are realized by means of photo cells and the control unit of the device. This device is however prone to failure as regards follow-up of the boards. It can happen that a board is supplied to a crosscut saw and the electronic board data (cutting list) of a different board is transmitted to the control unit of the crosscut saw. This leads to faulty crosscut results until the feeding error has been recognized by control mechanisms and the device is stopped. Subsequently, the device must be emptied or processing must be continued until the device is empty; this is disruptive to the production process and decreases the performance.

SUMMARY OF THE INVENTION

It is an object of the invention to design the device of the aforementioned kind in such a way that the boards during their transport to the crosscut saw can be monitored properly and that at the crosscut saw the boards and the correlated cutting list or board data are present.

This object is solved in connection with the device according to the invention in that in the transport path of the boards on the transverse transport unit at least one stop is adjustable which stop is adjustable or positionable, without scanning the boards, exclusively by means of a control unit and which stop, during adjustment of the transverse transport unit, prevents further transport of the boards onto the loading plane, respectively.

In the device according to the invention the boards, downstream of the feeding device, are reliably distributed by means of the transverse transport unit onto the desired loading plane without this requiring photo cells and other sensors for monitoring the boards. When the transverse transport unit is to be adjusted to a different loading plane, a stop is adjusted in the transport path of the boards and the boards coming from the feeding device will come to rest at this stop. During the time in which the transverse transport unit is adjusted to the new loading plane, the boards remain on the transverse transport unit. This mechanical means ensures that the boards are reliably supplied to the predetermined loading plane and the predetermined crosscut saws.

The stop at the transfer area between the feeding device and the transverse transport unit is moved into the transport path of the boards.

The stop is moveable from the transfer area to the other end of the transverse transport unit.

Upon reaching the other end of the transverse transport unit, the stop is stopped and the transverse transport unit is adjusted into a new position about the axis.

The stop is part of a circulating cam chain.

The transverse transport unit has endless circulating belts.

The cam chain is arranged between two endless circulating belts.

The cam chain is arranged adjacent to an endless circulating belt.

The belts and the cam chain have separate drives.

The stop emerges from the support plane of the feeding device in the area of a spacer, preferably of the last spacer before the deflection location.

Further features of the invention result from the additional claims, the description, and the drawings.

BRIEF DESCRIPTION OF THE DRAWING

The invention will be explained in more detail with the aid of the embodiments illustrated in the drawings. It is shown in.

DESCRIPTION OF THE PREFERRED EMBODIMENTS

Figure 1:
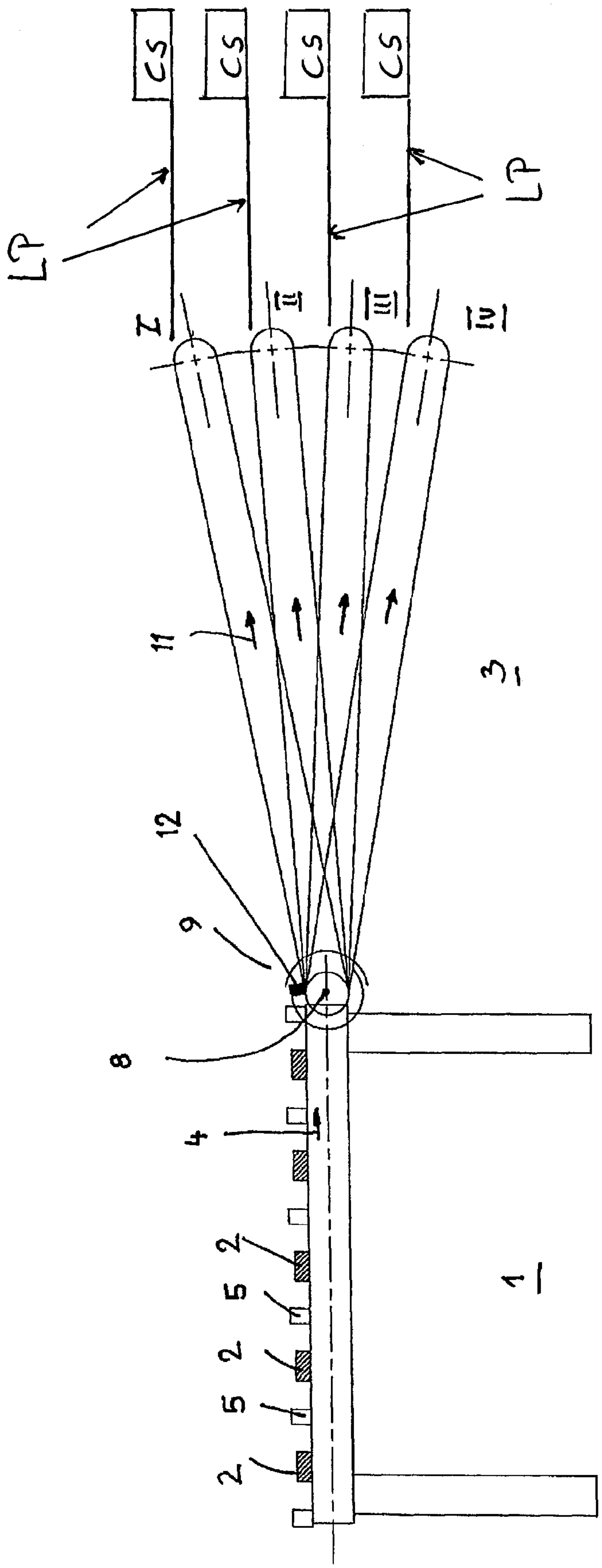
FIG. 1 in a simplified illustration a device according to the invention for supplying and distributing boards.

The device comprises a feeding device 1 for boards 2 that are supplied to a transverse transport unit 3 arranged downstream of the feeding device. The feeding device 1 can be embodied as a wide roller table with cam chain or as a wide transport belt. In the illustrated embodied the feeding device 1 is a wide roller table that has flat spacers 5 positioned transverse to its transport direction 4 for separating neighboring boards 2 from one another. The wide roller table is driven.

The boards 2 are transported by means of an upstream conveying unit (not illustrated) in their longitudinal direction into the space between the spacers 5. The conveying unit is formed, for example, by advancing rollers that rest on the boards 2 and transport them in the longitudinal direction onto the feeding device 1. The boards 2 have been scanned prior to this by so-called continuous scanners that are arranged stationarily and acquire data of the boards 2 in a way known in the art. A data set is produced for the acquired board data and based on this set crosscut saws (not illustrated) downstream of the device will saw the boards 2.

In the last compartment 6 of the feeding device 1 before transfer onto the transverse transport unit 3, it is checked by means of a sensor, preferably a photo cell (not illustrated), whether the boards 2 are aligned with their end face 7 relative to a terminal zero line. Parallel to the transport of boards 2 the correlated data sets are transferred to the appropriate saws. The boards 2 are transferred to the transverse transport unit 3 that is adjusted relative to the feeding device 1 in accordance with the cutting list. As can be seen in FIG. 1, the transverse transport unit 3 can be adjusted to various positions about axis 8 that is positioned transversely to the transport direction 4. As an example, four pivot positions I to IV of the transverse transport unit 3 are illustrated in FIG. 1. The pivot axis 8 is located in the transfer area 9 between the feeding device 1 and the transverse transport unit 3. By means of the transverse transport unit 3 the pieces of wood 2 are transferred to loading planes (not illustrated) that supply the boards to the downstream crosscut saws. In the illustrated embodiment, the transverse transport unit 3 can be pivoted into four different slanted positions. Each of these slanted positions has correlated therewith a crosscut saw in which the pieces of wood 2 are cut in accordance with their data set.

Figure 2:
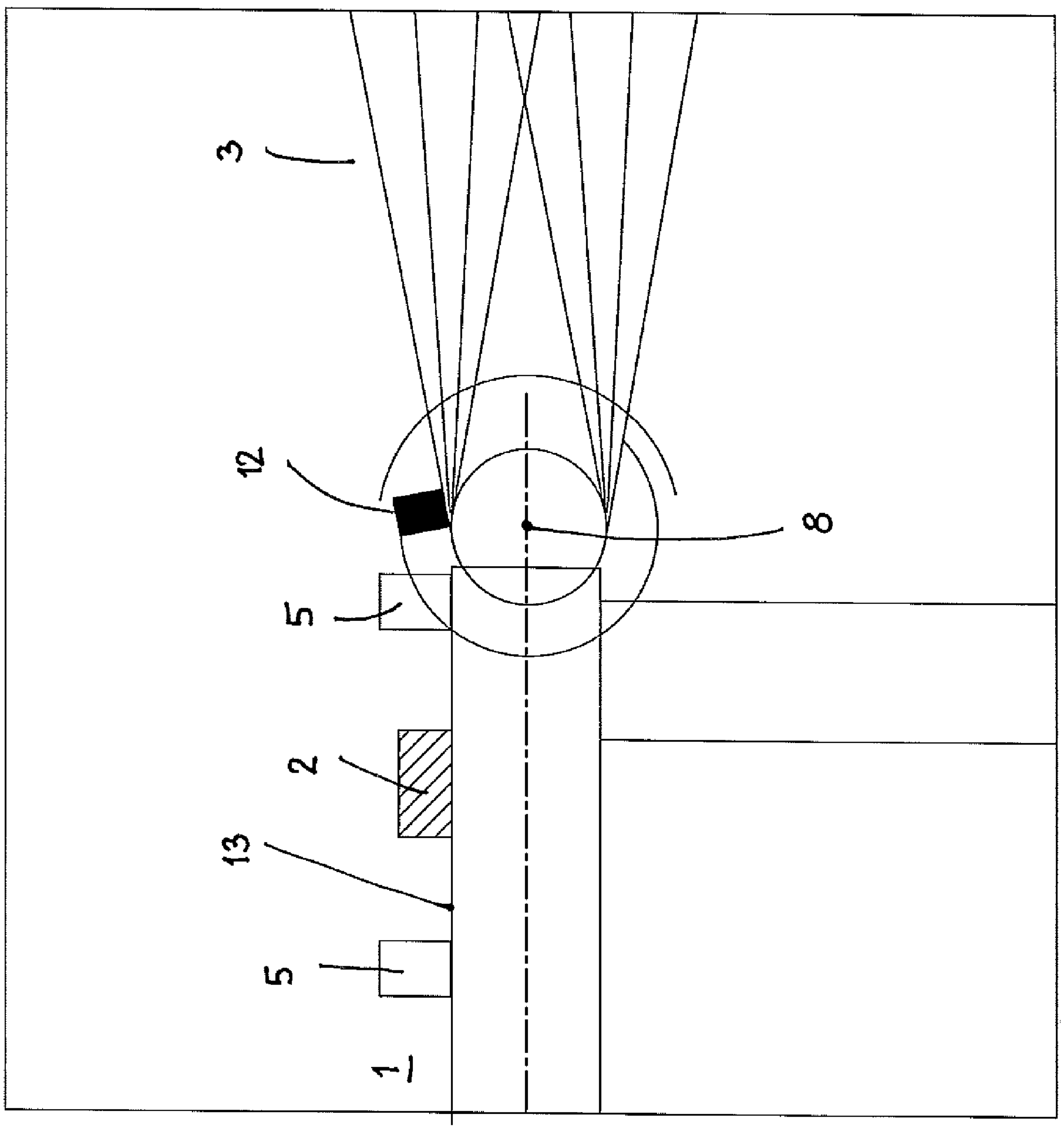
FIG. 2 in a detail illustration the transfer area between a feeding device and a pivotable transverse transport unit of the device according to the invention.

The transverse transport unit 3 is comprised of parallel adjacently positioned endless circulating belts 10 driven by a drive with which the boards 2 are transported in the transport direction 11 (FIG. 1). Parallel to each belt 10 a cam chain CC (FIG. 4) is provided that has one or several cams 12. In FIGS. 1 and 2 only one cam 12 is illustrated in an exemplary fashion. With the aid of FIG. 3, the effect of this cam (stop) 12 controlled by the control unit will be explained in detail. The driving action of the cam chain with the cams (stops) 12 is realized advantageously by means of a servo motor. The drive of the cam chain can also be realized by means of a frequency converter or a three-phase motor with brake. For stroke adjustment of the transverse transport unit 3 a motor drive, preferably a servo motor, is used. It is however also possible to pivot the transverse transport unit 3 by means of pneumatic or hydraulic devices. The transport belts 10 of the transverse transport unit 3 with the correlated deflection rollers are supported on a common frame (not illustrated) that is adjustable by means of the drive with regard to its vertical position.

Appropriate loading planes LP, depending on the slanted position I, II, III, IV, adjoin the end of the transverse transport unit facing away from the feeding device 1 (see FIG. 1); on the loading planes LP, the pieces of wood are supplied to the crosscut saws CS, respectively.

Figure 3:
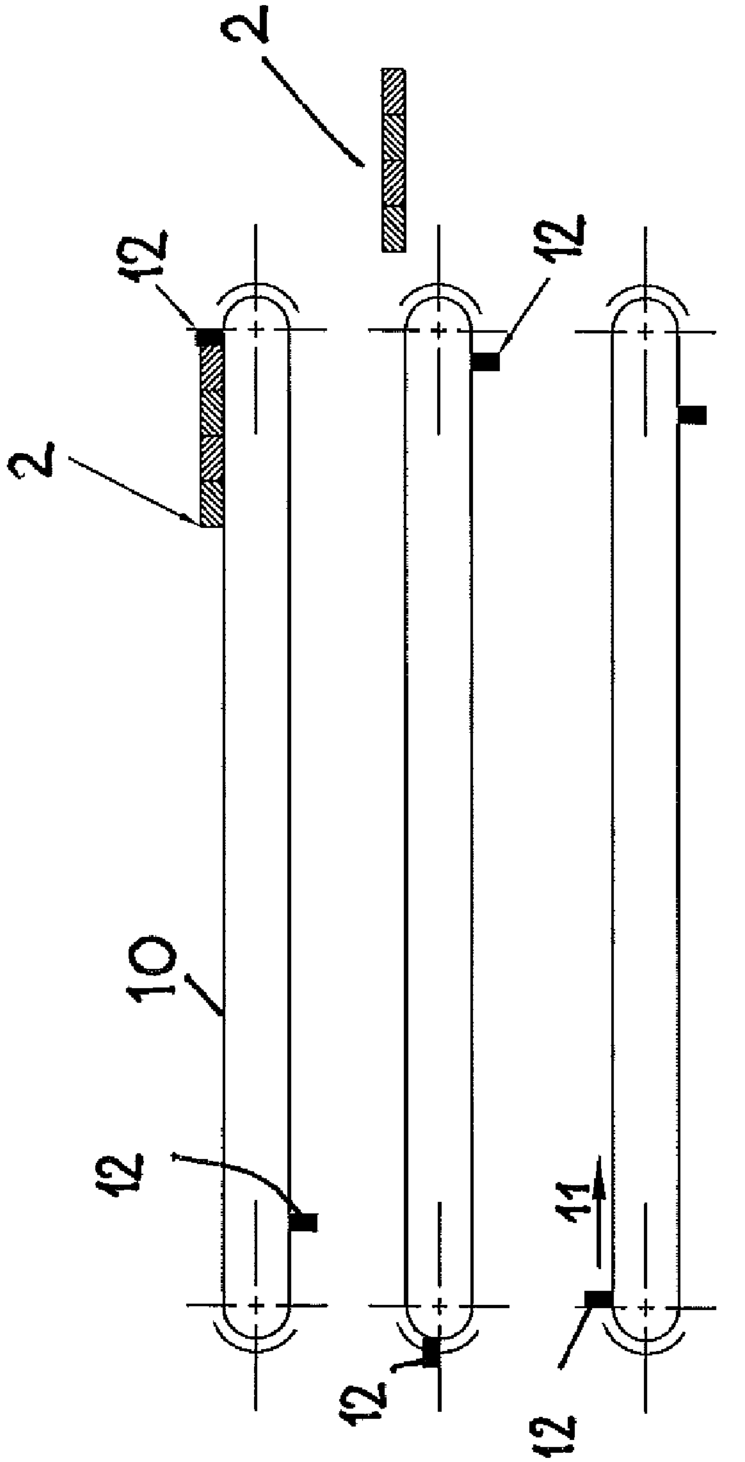
FIG. 3 in a schematic illustration different positions of cams in the area of the transverse transport unit.
Figure 4:
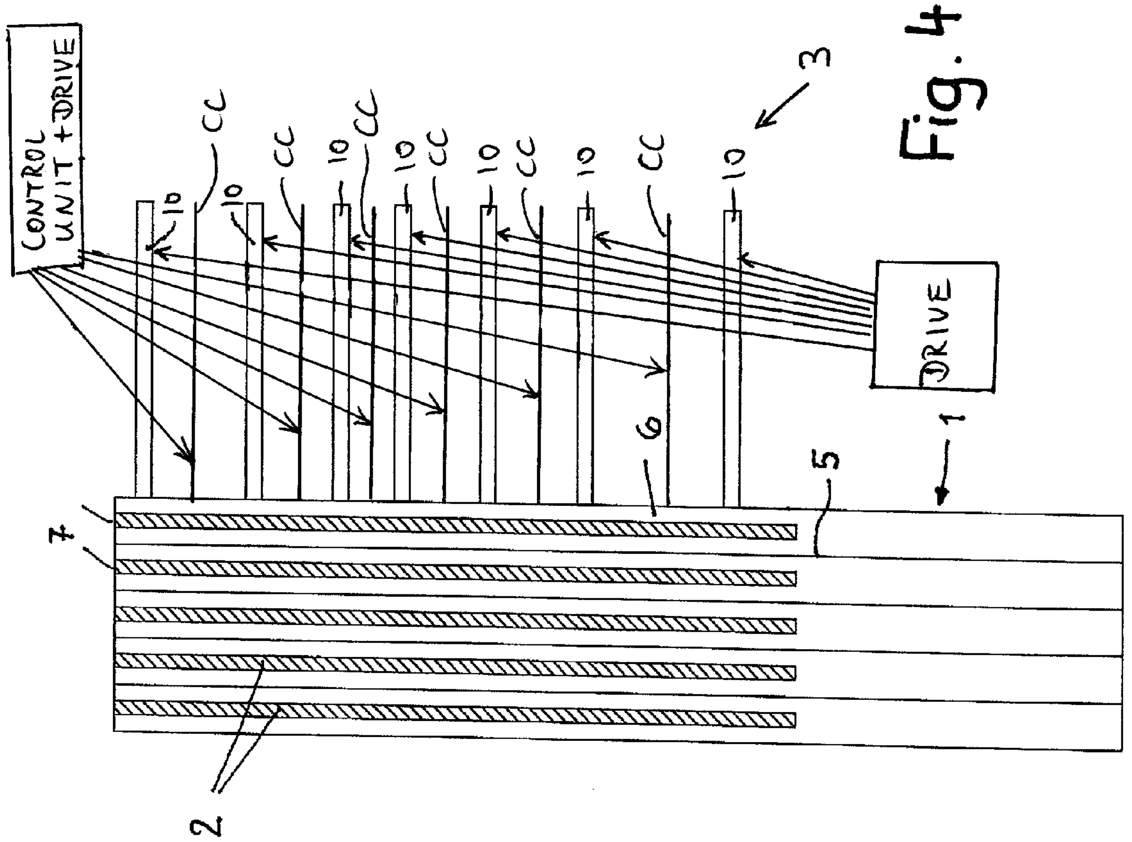
FIG. 4 a plan view onto the transfer area of the device according to the invention.

Based on FIG. 3 the function of a cam chain will be explained. They each have two cams 12 that project past the belts 10 of the transverse transport unit 3. First the boards 2 are transferred from the feeding device 1 to the transverse transport unit 3 that is in one of the pivot positions I to IV shown in exemplary fashion in FIG. 1. The cams 12 are arranged in accordance with the central illustration of FIG. 3. When enough boards 2 have been supplied sequentially to the corresponding loading plane and the loading plane is to be changed, the cam chains are driven such that the cam 12 is moved in the transfer area 9 between the feeding device 1 and the transverse transport unit 3 into the transport path of the boards 2 at the rearward end of the transverse transport unit 3 viewed in the transport direction 11. The movement path of the cam 12 is illustrated in FIG. 2. The drives of the feeding device 1 and of the cam chain are adjusted relative to one another such that the cam 12, viewed in the direction of axis 8, emerges in the area of the last spacer 5 before the deflection location out of the support plane 13 of the feeding device 1. The position of the cams 12 according to FIG. 2 corresponds to the lower illustration in FIG. 3. The other cam 12 of each cam chain is positioned in the area of the lower run of the belts 10. At the cam 12 that is in the blocking position the boards 2 that are supplied by the feeding device 1 are collected. The boards 2 that are in front of the cam 12 in the transport direction 11 can still be transported onto the loading plane. The cam 12 moves with the belts 10 until it reaches the leading end of the transverse transport unit 3 in the transport direction 11 (upper illustration in FIG. 3). The camshafts and thus the cams 12 are stopped and the transverse transport unit 3 is pivoted about axis 8 into a new position in order to supply a different loading plane with boards 2. The trailing cam 12 of the cam chain in the transport direction 11 is positioned at the lower run of the belts 10 so that the boards 2 are still transported from the feeding device 1 onto the transverse transport unit 3. In this way, the boards 2 are collected so as to rest against one another at the stopped cam 12. As soon as the transverse transport unit 3 has been pivoted accordingly, the cam chains are driven and the cam 12 is moved into the area of the lower run of the belts 10. The boards 2 are thus released and are transported onto the new loading plane. The position of the cams 12 immediately after release of the boards 2 is illustrated in the central illustration of FIG. 3. The other cam 12 is in a position so as not to impair the supply of boards 2 from the feeding device 1 onto the transverse transport unit 3. This position of the cams 12 corresponds to the basic position of the cam chain so that the belts 10 of the transverse transport unit 3 can receive the boards 2 from the feeding device 1 and transfer them onto the loading plane. In the lower illustration of FIG. 3, the left cam 12 is illustrated that is moved by driving the corresponding cam chain in the transport direction 11 toward its blocking position (upper illustration in FIG. 3). During the movement of the cam 12 into this blocking position the boards 2 supplied by the feeding device 1 are collected at its backside. Once the cam 12 has reached the blocking position in accordance with the upper illustration of FIG. 3, the drive of the cam chains is stopped and the transverse transport unit 3 is now pivoted about axis 8 to a new position in order to supply a different loading plane with boards 2. Once the transverse transport unit 3 has reached the new pivot position, the cam chains are driven and the cams 12 are accordingly moved into the release position (central illustration of FIG. 3) so that the boards 2 are supplied to a new loading plane.

When using this device, after transfer of the electronic cutting list to the crosscut saws photo cells or other sensors have no longer any effect on the distribution of the boards 2 so that errors in the subsequent cross-cutting work are excluded. The boards 2 are reliably supplied in the afore described way by means of the transverse transport unit 3 to the predetermined loading planes and thus also to the correct crosscut saws. This mechanical solution enables a simple constructive design of the device and provides reliable operation.

What is claimed is:

1. A device for supplying boards to crosscut saws, comprising:

at least one feeding device;

at least one transverse transport unit arranged downstream of the at least one feeding device;

at least two loading planes arranged downstream of the at least one transverse transport unit and positioned at different levels, wherein boards are supplied on the at least two loading planes;

wherein the at least one transverse transport unit is adjustable relative to the at least two loading planes about an axis that is transverse to a transport direction of the boards on the at least one transverse transport unit;

a control unit;

at least one stop adjustably arranged to be moved in and out of a transport path of the boards on the at least one transverse transport unit, wherein the at least one stop, without sensing the boards, is adjustable exclusively by the control unit; and wherein the at least one stop is positioned in a basic position outside of the transport path of the boards and is moved into the transport path only at a time, when the at least one transverse transport unit is being adjusted from a current position into a new position relative to the at least two loading planes, and the control unit actuates the at least one stop to move from the basic position into the transport path of the boards in a transfer area between the at least one feeding device and the at least one transverse transport unit to separate boards to be supplied in said new position from boards still to be supplied in said current position, to then move from the transfer area to a remote end of the at least one transverse transport unit, which remote end is remote from the transfer area, to stop at the remote end to collect the boards to be supplied in said new position and to release the boards collected at the at least one stop by returning into the basic position outside of the transport path of the boards when the at least one transverse transport unit has reached said new position.

2. The device according to claim 1, wherein, when the remote end is reached, the at least one stop is stopped and the at least one transverse transport unit is adjusted into the new position about the axis.

3. The device according to claim 1, further comprising a circulating cam chain provided on the at least one transverse transport unit wherein the at least one stop is connected to the circulating cam chain.

4. The device according to 1, wherein the at least one transverse transport unit comprises endless circulating belts.

5. The device according to claim 4, further comprising a circulating cam chain provided on the at least one transverse transport unit wherein the at least one stop is connected to the circulating cam chain and wherein the cam chain is arranged between two of the endless circulating belts.

6. The device according to claim 4, further comprising a circulating cam chain provided on the at least one transverse transport unit wherein the at least one stop is connected to the circulating cam chain and wherein the cam chain is arranged adjacent to one of the endless circulating belts.

7. The device according to claim 4, further comprising a circulating cam chain provided on the at least one transverse transport unit wherein the at least one stop is connected to the circulating cam chain and wherein the endless circulating belts and the cam chain have separate drives.

8. The device according to claim 1, wherein the at least one feeding device has a support plane provided with spacers and wherein the stop emerges from the support plane of the at least one feeding device in the area of one of the spacers of the at least one feeding device.

9. The device according to claim 1, wherein the at least one transverse transport unit comprises endless circulating belts, wherein the at least one feeding device has a support plane provided with spacers, and wherein the at least one stop emerges from the support plane of the at least one feeding device in the area of one of the spacers of the at least one feeding device, wherein said spacer is arranged last in a feeding direction of the at least one feeding device before a deflection location of the endless circulating belts.

* * * * *